United States Patent
Cunha et al.

(10) Patent No.: US 11,634,243 B2
(45) Date of Patent: Apr. 25, 2023

(54) STRAPPING METHOD AND APPARATUS

(71) Applicant: TITAN UMREIFUNGSTECHNIK GMBH & CO. KG, Schwelm (DE)

(72) Inventors: Jose Cunha, Wetter (DE); Ralf Dahlhaus, Breckerfeld (DE); Christian Noelke, Duesseldorf (DE)

(73) Assignee: TITAN UMREIFUNGSTECHNIK GMBH & CO. KG, Schwelm (DE)

( * ) Notice: Subject to any disclaimer, the term of this patent is extended or adjusted under 35 U.S.C. 154(b) by 133 days.

(21) Appl. No.: 17/059,384

(22) PCT Filed: Jun. 7, 2019

(86) PCT No.: PCT/EP2019/065038
§ 371 (c)(1),
(2) Date: Dec. 10, 2020

(87) PCT Pub. No.: WO2019/238587
PCT Pub. Date: Dec. 19, 2019

(65) Prior Publication Data
US 2021/0214109 A1 Jul. 15, 2021

(30) Foreign Application Priority Data
Jun. 11, 2018 (EP) ...................................... 8177062

(51) Int. Cl.
*B65B 13/32* (2006.01)
*B29C 65/14* (2006.01)
(Continued)

(52) U.S. Cl.
CPC .......... *B65B 13/32* (2013.01); *B29C 65/1432* (2013.01); *B29C 65/7841* (2013.01);
(Continued)

(58) Field of Classification Search
CPC ......... B65B 13/04; B65B 13/22; B65B 13/32; B65B 57/00; B29C 65/1432;
(Continued)

(56) References Cited

U.S. PATENT DOCUMENTS 4,527,379 A * 7/1985 Bartzick ............. B29C 66/4324
100/29
6,470,941 B1 * 10/2002 Wehr ................... B29C 66/4322
156/359

(Continued)

FOREIGN PATENT DOCUMENTS

| DE | 102008022396 B | 7/2009 | |
| DE | 102014211849 A | 12/2015 | |
| DE | 102014211849 A1 * | 12/2015 | ............. B29C 65/20 |

*Primary Examiner* — George R Koch
(74) *Attorney, Agent, or Firm* — Andrew Wilford (57) ABSTRACT

The invention relates to a method for producing strapping. A strapping band (4) is first guided about at least one packaging piece, tightened, and equipped with a closure at band ends (4a, 4b) to be connected in a closure unit (1). Furthermore, at least one sensor (7) connected to a control unit (8) is provided in the closure unit (1). One or more closure parameters are detected by means of the control unit (8) using the sensor (7), and the closure unit (1) is correspondingly actuated. According to the invention, the sensor (7) is designed as a load cell (7) which is let into a compression ram (6a, 6b) of the closure unit (1).

14 Claims, 5 Drawing Sheets

(51) Int. Cl.
  *B29C 65/78* (2006.01)
  *B29C 65/00* (2006.01)
  *B65B 13/04* (2006.01)
  *B65B 57/00* (2006.01)
  *B29L 31/00* (2006.01)

(52) U.S. Cl.
  CPC ...... *B29C 66/1122* (2013.01); *B29C 66/4322* (2013.01); *B29C 66/4324* (2013.01); *B29C 66/8226* (2013.01); *B29C 66/91231* (2013.01); *B29C 66/91421* (2013.01); *B29C 66/9231* (2013.01); *B29C 66/92211* (2013.01); *B29C 66/92441* (2013.01); *B29C 66/942* (2013.01); *B29C 66/944* (2013.01); *B29C 66/961* (2013.01); *B65B 13/04* (2013.01); *B65B 57/00* (2013.01); *B29L 2031/7276* (2013.01)

(58) Field of Classification Search
  CPC ............. B29C 65/7841; B29C 66/1122; B29C 66/4322; B29C 66/4324; B29C 66/8226; B29C 66/91231; B29C 66/91421; B29C 66/92211; B29C 66/92441; B29C 66/942; B29C 66/944; B29C 66/961
  See application file for complete search history.

(56) References Cited

U.S. PATENT DOCUMENTS

2002/0056252 A1   5/2002  Shibazaki
2003/0061785 A1*  4/2003  Sakaki .................... B65B 13/22
                                                         53/399
2017/1349307      12/2017 Seelos

* cited by examiner

STRAPPING METHOD AND APPARATUS

CROSS REFERENCE TO RELATED APPLICATIONS

This application is the US-national stage of PCT application PCT/EP2019/065038 filed 7 Jun. 2019 and claiming the priority of European patent application 18177062.9 itself filed 11 Jun. 2018.

The invention relates to a method of strapping where a strapping band is guided around at least one package, tensioned and ends of the band are connected together by a sealing device, after which at least one sensor connected to a controller in the sealing device detect and feeds one or more seal parameters to the controller that in turn controls the sealing device.

Strapping apparatuses and the corresponding methods of strapping have been part of the state of the art for years and in different versions. The packages to be strapped can be parcels, magazines but also metal strip coils, bales, etc. The strapping ensures that the package does not open or fall apart, for example during transport.

When strapping bales with the help of welded plastic straps, dynamic loads occur that are or can become so great that the strapping straps rip. In particular, a welding connection common to plastic straps at the band ends is prone to this. As a result, problems can arise not only during transport, but also during subsequent handling.

The basic procedure for the production of strapping and the search for an appropriately designed device are described by way of example in DE 10 2008 022 396 by the applicant. In addition, in the prior art according to DE 198 31 665 [U.S. Pat. No. 6,470,941], approaches already exist to the effect of detecting a welding process in plastic straps. For this purpose, a heater is equipped with a cut-off switch actuated directly or indirectly by a pressure element. A sensor with a signal transmitter is associated with the pressure element to detect changes in the spacing between the pressure element and a support surface. Corresponding signals are fed to evaluation electronics that generate a switch-off signal for switching off the heater when the distance between the pressure element and the support surface reaches a predetermined target value.

In the generic prior art according to DE 10 2014 211 849, the procedure is that one or more physical actual parameters of the tail head of a strapping band and/or the material connection made in the area of the weld are sensed and/or detected. The physical actual parameters are transmitted to a computerized controller.

Taking into account the physical actual parameters, a temperature level of the welding head and/or the dwell time of a temperature application and/or a duration or force of the contact of a plunger on a pressure plate are specified via the computer-aided controller. In this way, when welding plastic straps, a consistently high quality of the bracing to be achieved should be guaranteed.

The teaching described according to DE 10 2014 211 849 has generally proven itself, but remains vague with regard to the concrete implementation. In addition, direct control of the welding process during manufacture of the seal for strapping made of plastic is in the foreground. Any conclusions, for example for determining the wear on the sealing device or for further evaluation of the detected sensor signals, cannot be drawn. This is where the invention comes in.

The object of the invention is to further develop such a method of strapping so that the detected sensor signals cannot only be used to provide a secure seal, but sealing documentation is also made available. An appropriately suitable apparatus should also be provided.

To attain this object, a generic method of strapping is used by this invention, but characterized in that the sensor is a force sensor embedded in a sealing ram of the sealing device. Such a force sensor or, in general, a load cell is a sensor or force sensor, with the aid of which the force that acts on it is measured. In the present case, the sensor is embedded in the sealing ram of the sealing device, so that, according to the invention, the force exerted by the sealing ram on the band ends of the strapping band to be connected during manufacture of the seal is recorded with the aid of the force sensor.

All types known from practice can be used for such a force transducer or sensor. Examples of this are a spring-type force transducer whose spring body is elastically deformed. The deformation of the spring body is recorded by a strain gauge whose electrical resistance changes with the expansion. As a result, a changing electrical voltage is observed as a sensor signal. In principle it is also possible to work with a piezoelectric force transducer in which a force distribution in a piezoceramic element is observed that is proportional to the force. The charge distribution can be measured with a current amplifier and made available on the output side as a corresponding sensor signal. In principle, such force transducers can be used when there is a change in their electrical resistance under the action of force. In this case, the electrical resistance or its change in resistance is made available on the output side as a sensor signal. The named force transducers or differently working force sensors are of course only examples and are in no way to be considered restrictive.

The corresponding sensor or force signals are transmitted to the controller. According to the invention, the controller not only ensures that the sealing device is activated as needed in that the heat is applied, stopped or withdrawn, for example, depending on the force measured on the sealing ram. It is generally possible to work with feedback-type regulation of the force on the sealing ram depending on the sensor signals of the force sensor. Instead, according to the invention, the sensor signals from the force sensor can be recorded in the controller together with additional sensor signals from other sensors and correlated with these parameters or sealing parameters specific for the strapping band in order to preferably vary a pressure force of the sealing ram on this basis.

As already explained above, the force that is present or applied with the aid of the sensor or the force sensor on the sealing ram of the sealing device is consequently measured and transmitted to the controller. Depending on the pressure force of the sealing ram detected in this way, this pressure force can be varied. This can take place in the sense of control with or without feedback of the force on the sealing ram as a function of the sensor signals of the force sensor. For this purpose, the pressure force of the sealing ram may be controlled accordingly with the aid of the controller. Alternatively or additionally, however, it is also possible to change the pressure force, for example by changing the springs provided accordingly, in order to change the pre-stress of the sealing ram.

These specific parameters or sealing parameters for the strapping are values that characterize the strapping used around the one or more packages. If, for example, plastic straps are used, the specific sealing parameters for the strapping are, for example, the geometric dimensions of the strapping, its material thickness and its composition or the plastic or the majority of plastics used for its manufacture. In principle, the fastening parameter specific to the strapping band or the several parameters can simply be an product number under which the aforementioned fastening parameters are stored. Of course, this is only an example.

In any case, the sensor signals of the force sensor are optionally correlated with additional sensor signals from other sensors in the controller with the specific sealing parameters for the strapping band. In this way, the sensor signals and the fastening parameters specific to the strap, taken together, define sealing data. This sealing data can now be evaluated. One possibility for evaluating the sealing data is to determine the amount of wear on the sealing device. For example, based on the forces measured with the aid of the sealing ram, as well as taking into account the number of sealing cycles, it is possible to estimate when maintenance of the sealing device is required and how great the current wear of the sealing device is compared to, for example, a new part.

In addition, values for the consumption of strapping material can be determined from the sealing data. From these consumption values strapping material can be estimated and deduced when the supply of strapping material present, for example, at the location of the corresponding strapping apparatus is exhausted and a subsequent delivery is required.

In addition, the sealing data can be used for documentation. This is particularly advantageous in connection with warranty cases in order to determine whether, for example, the strapping apparatus has been operated and serviced according to specifications. In addition, the sealing data can be evaluated in order to predict future wear and to counter a possible failure of other similar or identically constructed strapping apparatuses in advance. As a result, a corresponding failure can practically be ruled out from the outset and permanent functional reliability guaranteed. This was not possible with the methods described so far here. This is where the main advantages can be seen.

As further sensors in addition to the force sensor, a temperature sensor in a hot wedge, a timer, a pressure sensor in the sealing ram and/or in a counter plate, a displacement sensor in the sealing ram and/or an additional clamping ram etc. can be provided individually or in combination. In this case, too, the sensor signals from the additional sensors are transmitted to the controller and combined with the parameters specific to the strapping band as a whole to form the sealing data, as has already been described above.

As a further advantageous embodiment the controller transmits at least the sealing data via a computer network, for example the internet, to a higher-level controller or evaluation unit for collecting and evaluating the sealing data. The invention is based on the discovery out that the controller is typically assigned to the device for making the strapping or a corresponding strapping apparatus, that is to say it is a component of the strapping apparatus on site. In contrast, the evaluation unit for collecting and evaluating the sealing data can be available and implemented at practically any location worldwide. For example, the evaluation unit may be located at the manufacturer of the corresponding strapping apparatus, whereas the controller, as a component of the strapping apparatus, is located with the respective customer and user.

To ensure that the particularly relevant sealing data are transmitted to the evaluation unit, the computer network couples the controller to the evaluation unit for data transmission. The data transmission can of course be wired or wireless. Since, in addition, as a rule, several controllers of different strapping apparatuses send their respective sealing data to the higher-level evaluation unit, not only the evaluations described above can be carried out in the evaluation unit. Instead, statistical determinations can be made with the aid of the evaluation unit, which can for example be derived from the sealing data. In principle, further data, in addition to the sealing data, can be transmitted to the higher-level evaluation unit via the computer network via the controller of the strapping apparatus.

As a rule, the sealing device has at least one further clamping ram in addition to the sealing ram. The sealing device is usually equipped with the sealing ram and two clamping rams flanking it. Thus, the sealing ram is between two clamping rams.

In addition, the design is usually such that the clamping ram and the sealing ram work with a counter plate. When, in this context, a single continuous counter-plate is provided in the sealing device, the result is a particularly compact and inexpensive design. Both the sealing ram as well as the one or both clamping rams move selectively against the continuous counter plate. In this way, the band is clamped between the one or both of clamping rams and the counter plate. If the sealing ram moves against the counter-plate, the two band ends to be connected can be welded together, as will be explained in more detail below.

The above-mentioned force sensor is generally arranged with the interposition of a spring if necessary in a recess of a ram extension of the sealing ram. In addition, the force sensor usually is on the lower face above the ram extension. As a result, the force sensor can support itself on a base of the sealing ram. Thus, the sealing ram is usually built in two parts and is composed of the base and the ram extension that are usually arranged in the same longitudinal extension and are acted upon together. The mechanical connection between the base and the ram extension is via the force sensor. As soon as a force is applied to the base, usually in a straight line, the base moves in the direction of the ram extension and compresses the force sensor in the process. The force applied is converted in the force sensor into a sensor signal proportional to the force, which the controller picks up.

Because the force sensor is in a recess in the ram extension, there is protection for the force sensor and any damage to the force sensor is virtually excluded. In this context, the optional and interposed spring ensures, for example, that slight loads on the sealing ram are not detected by the force sensor, but rather correspond to a more or less pronounced compression of the spring. This is particularly advantageous when the sealing ram is subjected to vibrations, because it keeps any vibrating movements away from the force sensor and enables permanent and functionally reliable operation without damage. Of course, the interposed spring is only to be seen as an option and not absolutely necessary.

The sealing device is also equipped with band guides connected on one or both sides. The strapping band is fed to the sealing device via these band guides or, when looping around the one or more objected being strapped, the band passed through the sealing device and the connected band guide is led around the one or more objects being strapped. The two band ends of the strapping band to be connected are in the sealing device after the one or more packages have been looped around, so that the seal can be implemented here as described.

A cam assembly is generally used to control the rams. With the help of this cam assembly, the individual rams, the heat of one or both clamping rams on the one hand and the sealing ram on the other, are acted upon selectively and generally linearly. For this purpose, the cam assembly is essentially composed of a central camshaft and control levers on one or both sides. The central camshaft generally acts directly on the sealing ram. On the other hand, one or both control levers ensure that one or both clamping rams on both sides can also be acted upon in a linear manner.

As a result, a method and apparatus for strapping are described, with the aid of which not only a secure sealing of the band ends of the strapping in question can be produced in a reproducible manner. In addition, there is also the possibility of determining, collecting and evaluating the sealing data that arise during the sealing process. This can be used, for example, to gain knowledge about the wear and tear of the sealing device and with regard to future maintenance. All of this succeeds in principle and regardless of how the strapping is designed in detail or how the seal is designed.

Thus, the invention can not only be used for strapping made of plastic, in which the band ends to be connected are mostly coupled to one another by a weld. Rather, the invention can also be used just as well with metal or steel strips. In this case, the band ends to be connected are coupled to one another in the sealing device with the aid of the sealing ram by crimping or an additionally pushed-on seal clip. All procedures are possible according to the invention and are expressly included.

In the following the invention is described in more detail with reference to a single embodiment shown in the drawing in which:

FIG. 5 shows an example of the formation of the weld seal, The figures show an apparatus for strapping or a strapping machine in its basic form, in overview in FIG. 1. For the apparatus and method for strapping to be described there is a single sealing device 1 having two adjacent guides 2, 3 for the band 4. The band 4 is but does not have to be made of plastic.

The two guides 2 and 3 on both sides of the sealing device 1 ensure that the band 4 from a not fully shown supply is applied to and guided around one or more packages. After being fed around the package a band end 4a of the strapping band 4 moves toward a stop 5 in the sealing device 1, as shown in detail in FIG. 2. As soon as the end of the band 4a has moved against the stop 5, the strapping process and further feed of the strapping band 4 connected with it are stopped. This process is referred to as band insertion and is essentially shown in FIG. 2.

Figure 2:
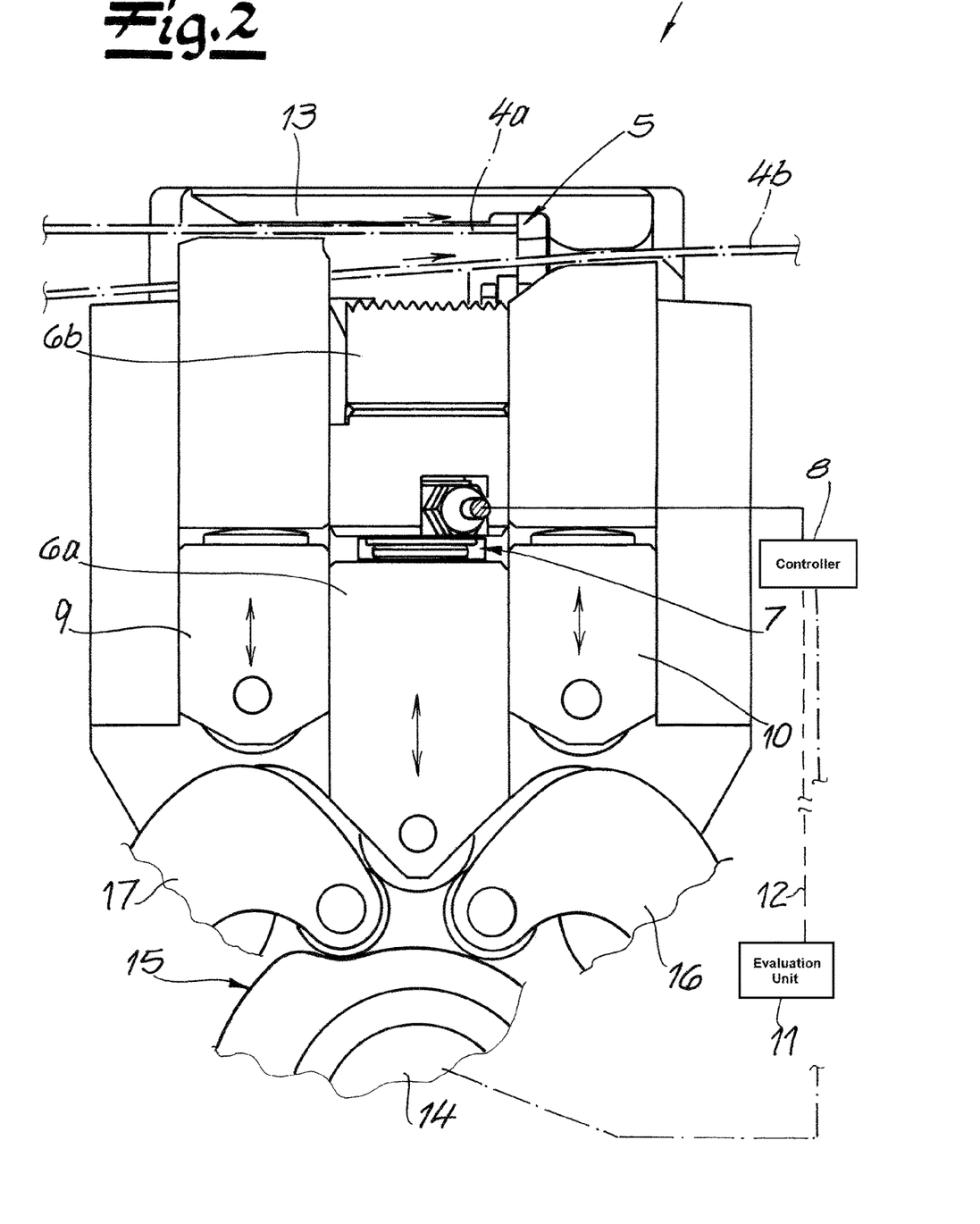
FIG. 2 shows a detail from FIG. 1 in the part of the sealing machine as the band is inserted.
Figure 3:
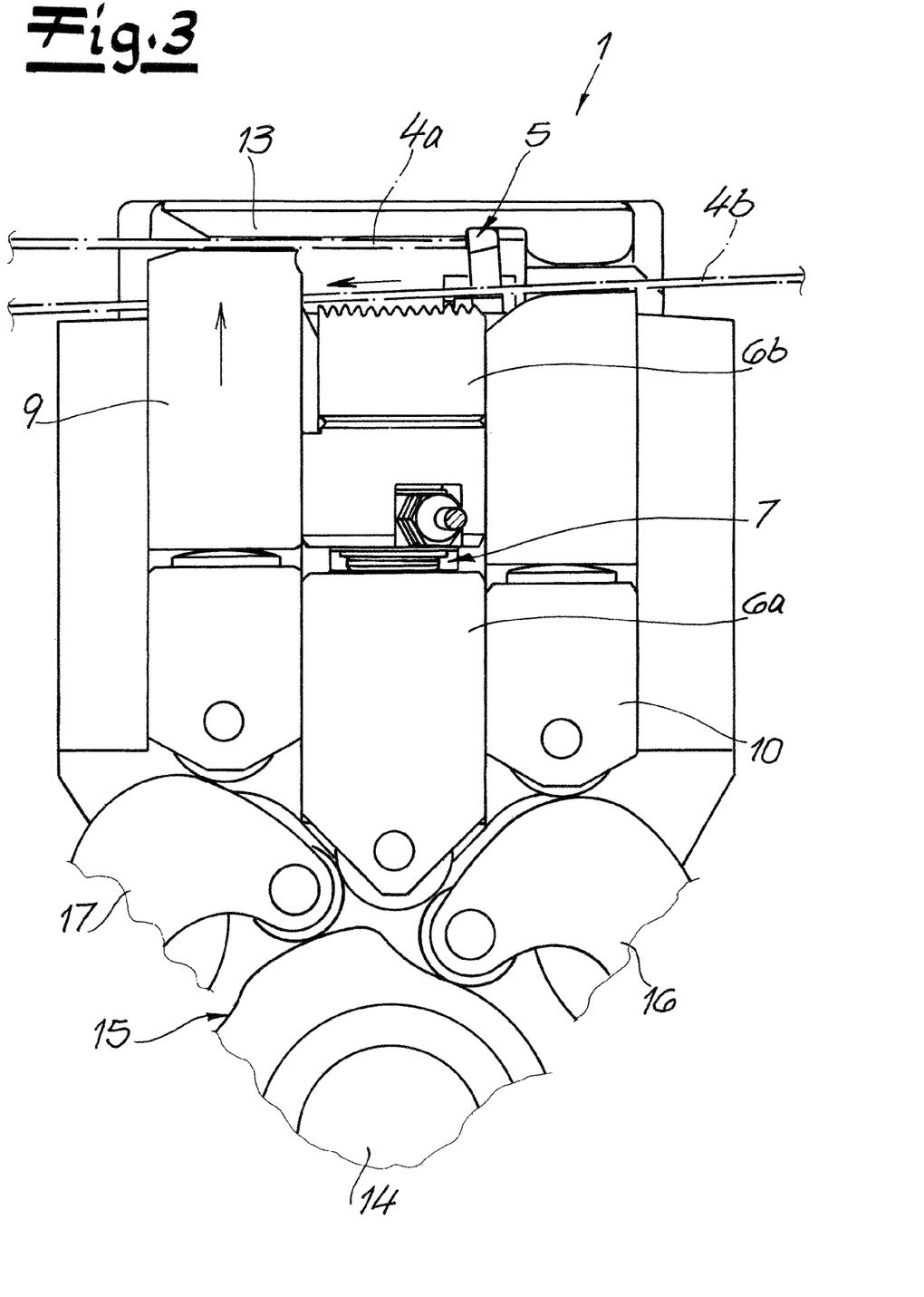
FIG. 3 shows tensioning of the strapping band as in FIG. 2.

After the band has been inserted as shown in FIG. 2, it is tensioned as shown in FIG. 3.

Figure 1:
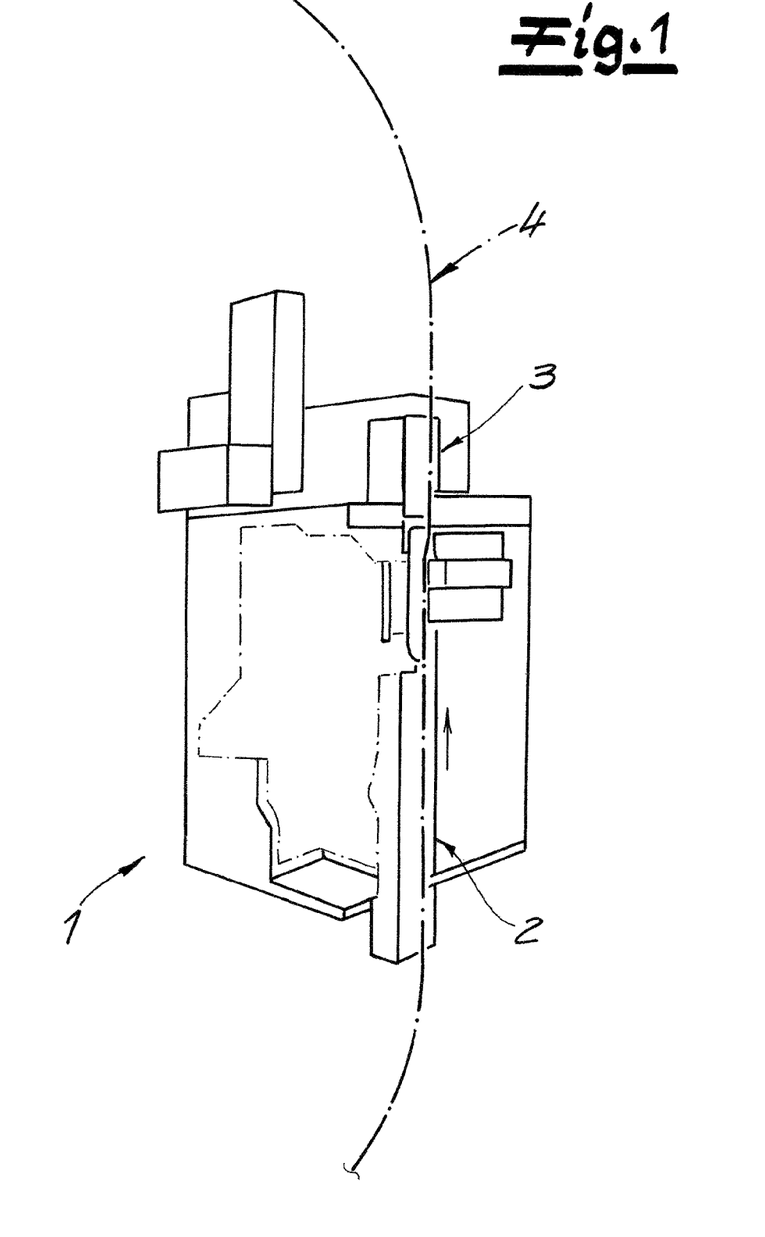
FIG. 1 is an overview of an apparatus for strapping or a strapping machine according to the invention.

The tensioning process or the band insertion is indicated in the figures by corresponding arrows that show the movement directions of the band 4. The band insertion and tensioning are effected by drive and tensioning rollers that are part of the strapping machine according to FIG. 1 but, however, of no further interest here.

It can be seen that the sealing device 1 is provided with a sealing ram 6a, 6b. The ram 6a, 6b is divided into two parts in this embodiment. In fact, the sealing ram 6a, 6b consists of a base 6a and a plunger 6b that are spacedly stacked. A space between the base 6a and the plunger 6b is filled by a force sensor 7. In fact, the force sensor 7 is, if necessary, provided with a spring (not shown in greater detail) in a recess in the plunger 6b of the sealing ram 6a, 6b.

The force sensor 7 in this embodiment is but does not have to be flat and cylindrical and fits in a complementarily shaped recess, not shown in detail, of the plunger 6b of the sealing ram 6a, 6b. Overall, the design is such that the force sensor 7 extends under the lower face of the plunger 6b and sits atop an upper face of the base 6a of the sealing ram 6a, 6b. If the sealing ram 6a, 6b is now subjected to linear force, the base 6a moves toward the plunger 6b. The sealing ram 6a, 6b compresses together the two ends 4a, 4b of the strapping band 4 to be connected and the force sensor 7 is deformed proportionally to the compression and produces a corresponding force-proportional output signal that is transmitted to the controller 8 connected to the sensor 7.

The controller 8 is designed as part of the strapping machine and actuates the flanking sealing rams 9, 10 as will be explained below. The controller 8 works for this purpose via a control-cam system 14, 15, 16, 17 to be described below. The controller 8 is part of the strapping machine with a master evaluation unit 11 coupled for data exchange. A computer network 12 provides the coupling. The data technology coupling can be wireless or wired. Mostly the computer network 12 is part of the internet.

Both the sealing ram 6a, 6b and the clamping rams 9 and 10 flanking the sealing ram 6a, 6b work together with a counter plate 13. In this embodiment, it can be seen that the sealing device 1 in this context has a single continuous such counter-plate 13 with which both the two the clamping rams 9, 10 and the sealing ram 6a, 6b interact. To do this, the two clamping rams 9, 10 or the sealing ram 6a, 6b each can bear against the counter plate 13. The rams in question 6a, 6b; 9, 10 each move in a straight line as shown by double-headed arrows in FIG. 2.

For the linear movement of the rams 6a, 6b, 9, 10 the cam assembly 14, 15, 16, 17 is acted upon by the controller 8. The cam assembly 14, 15, 16, 17 ensures that the rams 6a, 6b, 9, 10 are moved linear selectively as shown by the double-headed arrows in FIG. 2 against the move plate 13. The cam assembly 14, 15, 16, 17 has for this capability a central camshaft 14. The central camshaft 14 is provided with a circumferential cam 15. The central camshaft 14 works with the aid of the cam 15 on flanking control levers 16, 17. The control lever 16 acts on the here right-hand clamping ram 10, and on the control lever 17 for linear actuation of the left-hand clamping ram 9.

All the rams 6a, 6b; 9, 10 are equipped on their ends with respective rollers that in turn roll on control levers 16, 17 or on the cam 15 of the camshaft 14. Rotation of the camshaft 14 actuates the rams 6a, 6b; 9, 10 selectively and depending on the for linear movement, as will be described in more detail below.

In fact, the controller 8 rotating the cams 14 to 17 initially ensures that, once band insertion according to FIG. 2 is effected, all the rams 6a, 6b; 9, 10 are retracted out of contact with the counter plate 13 so that the strapping 4 can move unhindered through the sealing device 1. In the transition from the FIG. 2 position, the left clamping ram 9 moves linearly for the band tensioning according to FIG. 3 as shown by the FIG. 3 arrow. That way, the band end 4a of the band 4 engaging the stop 5. The other end of the band 4b can then be tensioned, as indicated by an arrow adjacent the band 4 in FIG. 3.

Figure 4:
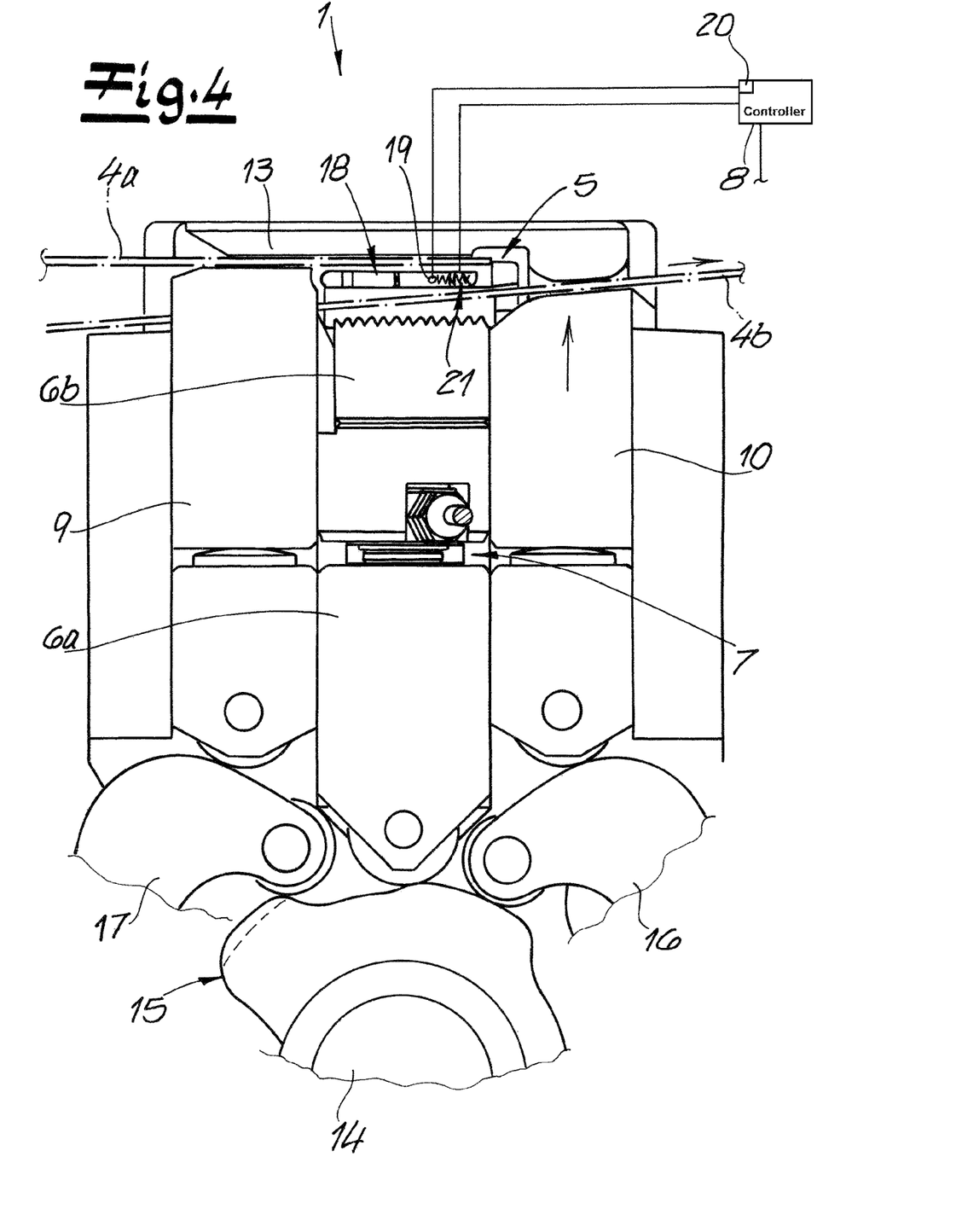
FIG. 4 shows relaxation of the strapping band and fusing the band ends together.

In the transition from FIG. 3 to FIG. 4, the strapping band 4 is now relaxed. In this case, the left ram 9 is still moved against the counter plate 13 and ensures that the band end 4a remains clamped. Since the other end of the band 4b of the band 4 is relieved or the tensioning rollers no longer exert any tension, in the functional position according to FIG. 4 a heated tongue or a heating wedge 18 can be fitted between the two band ends 4a, 4b of the band 4. The heating tongue or wedge 18 now ensures that at least the surfaces the strip ends 4a, 4b melt.

In order to detect the temperature of the heating tongue or the heating wedge 18, there is an embedded temperature sensor 19 whose output signals as well as the signal described above from the force sensor 7 are transmitted to the controller 8. A timer 20 for example provided in the controller 8 can determine the heating time of the heating tongue 18 and also, for example, its temperature if the controller 8 is also coupled to a (resistance) heater 21 inside the heater 18.

In any case, the band ends 4a, 4b of the strapping band 4 can thus be melted together. The heater 21 in connection with the temperature sensor 19 ensure that only the surfaces of the strip ends 4a, 4b are melted, there is no through melting. This happens depending on the following seal parameters yet to be explained. As a result, the band ends 4a, 4b are in an optimal state if subsequently at the transition from FIG. 4 to FIG. 5 the two band ends 4a, 4b are welded together. During the FIG. 4 relaxing of the strapping band 4 and the fusing of the band ends of 4a, 4b, the clamping ram 10 is moved against the counter plate 13 and ensures that the other end of the band 4b is fixed here.

Figure 5:
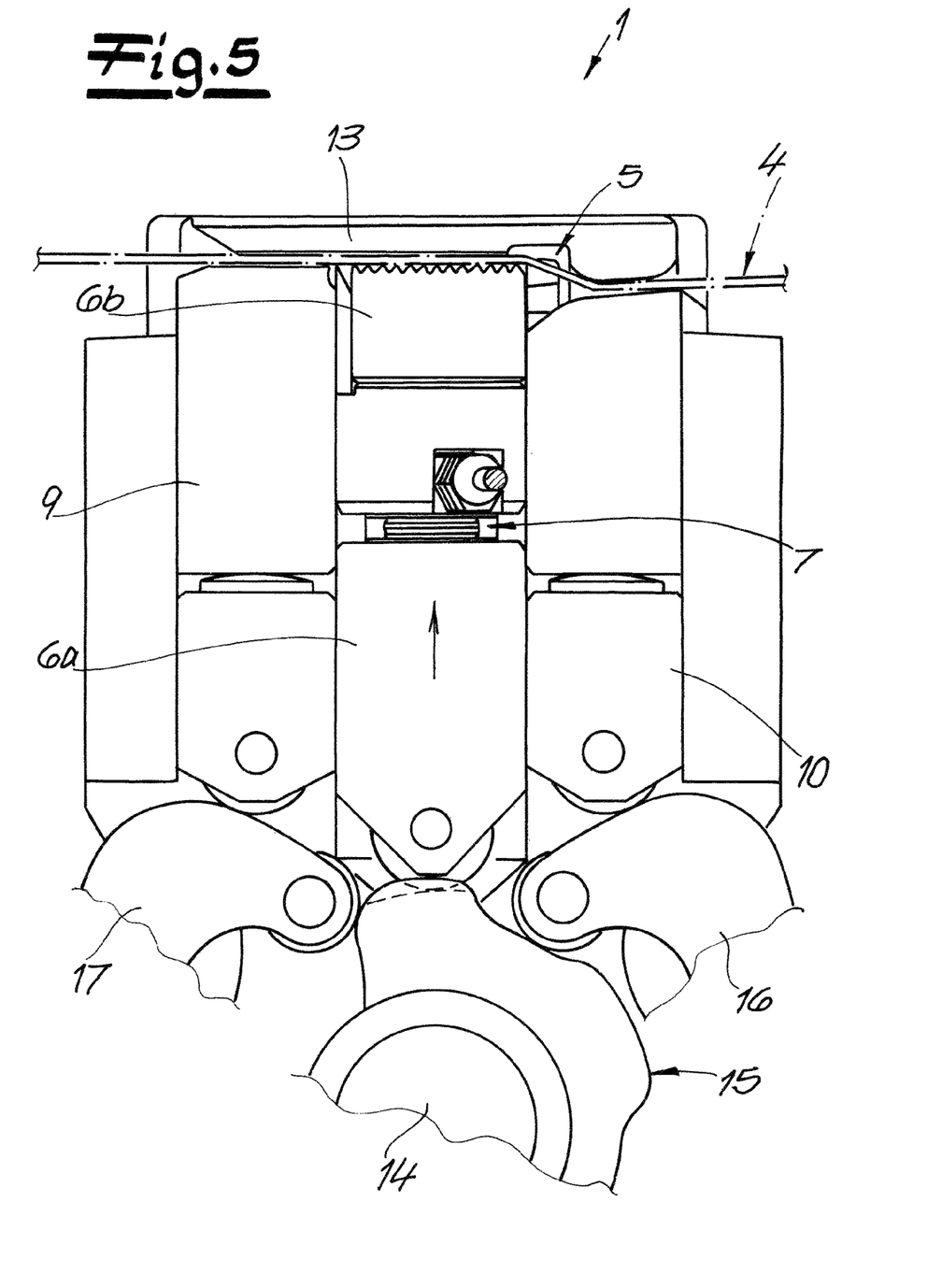

In fact, in FIG. 5 the seal weld is now formed. To this end the sealing ram 6a, 6b presses the two band ends 4a, 4b against the counter plate 13. The two band ends 4a, 4b are connected to one another in an integral material bond. In addition, the force sensor 7 embedded in the sealing ram 6a, 6b measures the force exerted on the seal. The corresponding sensor signals from the force sensor 7 are transmitted to the controller 8 for this purpose. At the same time, the controller 8 ensures that the seal shown in FIG. 5 or the seal formation by the sealing device 1 and specifically the sealing ram 6a, 6b are controlled as a function of the seal parameters.

These seal parameters may be parameters of the band 4 such as its width, the material thickness and in particular the plastic used, for example polyethylene (PP), polypropylene (PP) or a mixture thereof. In any case, these seal parameters are taken into account by the controller 8 and the sealing device 1 or the sealing ram 6a, 6b is controlled accordingly. The sealing parameters are taken into account of course also upstream of the melting according to FIG. 4, as already described in this context. In the context of this embodiment, not only are the sensor signals of the force sensor 7 fed to the controller 8. The controller 8 also detects other sensor signals, according to this embodiment sensor signals of the temperature sensor 19 as well as signals of the timer 20. All these sensor signals of the further sensors or the force sensor 7, the temperature sensor 19 and the timer 20 are now correlated with specific parameters of the strapping. These specific parameters for the strapping are those seal parameters already mentioned above.

In other words, the parameters specific to the strapping (or sealing parameters) include the geometric dimensions of the band 4, for example material thickness and width. This also includes the material used for the strapping 4 made of plastic. In addition, the seal parameters determined and taken into consideration can then be such as the temperature and duration of melting, the force applied to the seal, the year of manufacture of the strapping, a batch number of the plastic used, etc. These sealing parameters specific to the strapping can now be present in the controller 8 or fed into it and correlated with the previously already mentioned sensor signals. The correlation of the sensor signals with the specific fastening parameters for the band are now grouped together as seal data.

The seal data can be evaluated and stored. For example, predictions can be made from it and derived for wear of the sealing device 1 and in particular the sealing ram 6a, 6b and, if applicable, the clamping ram 9, 10. Future maintenance can even be scheduled based on the wear determination of the sealing device 1 realized in this way. They can also be used to monitor the consumption of strapping material or strapping bands 4.

As a rule, all of these evaluations based on the seal data are not preloaded into the controller 8. Rather, for this purpose, the sealing data is loaded into the controller 8 via the computer network 12 via the higher-level evaluation unit 11. The evaluation unit 11 is consequently loaded with comprehensive technical information about the condition of the strapping machine. Because from the evaluation unit 11, of course, more than the seal data can be collected and evaluated. Other data from the strapping machine can also be accessed via the controller 8 and the computer network 12 and transmitted to the evaluation unit 11. Thus the evaluation unit 11 is also able to determine, for example for documentation purposes, the state of the strapping machine in question or any to make determinations about its development over time. Significant advantages are thus to be seen.

The invention claimed is:

1. A method of strapping comprising the steps of:
    providing a sealing device formed by a plate and by a sealing ram having a base part and an extension part both displaceable relative to the plate in a straight line and spaced apart along the line;
    guiding a band around a package in a loop, tightening the band therearound and juxtaposing ends of the loop of the band between the plate and the sealing ram in the sealing device;
    providing between the parts of the sealing ram a load cell in contact with and transmitting force between the parts and connected to a controller in the sealing device;
    compressing and sealing together the ends of the band with the ram between the sealing ram and the plate while detecting a seal parameter with the load cell and transmitting the detected parameter to the controller; and
    actuating the sealing device with the controller according to the detected parameter.

2. The method according to claim 1, wherein the sealing device is provided next to the sealing ram with a clamping ram.

3. The method according to claim 1, wherein the clamping ram works with the sealing ram to press the band against the plate.

4. The method according to claim 3, wherein the plate is continuous, the method further comprising the step of:
    the sealing ram and the clamping ram moving selectively to press the band against the plate.

5. The method according to claim 1, wherein the load cell is fitted with interposition of a spring in a recess of a ram extension of one of the parts of the sealing ram.

6. The method according to claim 1, wherein the detected parameter is sent as a sensor signal from the load cell to the controller, the method further comprising the step of:
 correlating the detected parameter together with additional sensor signals from other sensors and with sealing parameters specific to the band to apply to the loop ends an adjustable pressure force with the sealing ram.

7. The method according to claim 6, the method further comprising the steps of:
 providing in the sealing ram and/or in the plate a temperature sensor in a heating wedge, a timer, or a pressure sensor, providing a displacement sensor in the sealing ram and/or in the clamping ram individually or in combination; and
 feeding sensor signals from all of the sensors to the controller.

8. The method according to claim 6, wherein the sensor signals and the strapping band specific sealing parameters taken together form sealing data.

9. The method according to claim 8, further comprising the step of:
 evaluating the sealing data to determine wear and tear and maintain the sealing device to determine the consumption of strapping material, or for documentation.

10. The method according to claim 8, further comprising the step of:
 the controller collecting and evaluating the sealing data via a computer network.

11. The method according to claim 1, further comprising the step of:
 guiding both edges of the band band with respective band guides.

12. The method of claim 1, the method further comprising the step of:
 clamping the band on both sides of the sealing ram with two clamping rams flanking the sealing ram.

13. The method according to claim 12, further comprising the step of:
 applying the clamping rams selectively linearly via a cam assembly.

14. The method according to claim 13, further comprising the steps of:
 actuating a central camshaft of the cam assembly to operate the sealing ram and upper control levers acting on the two clamping rams.

* * * * *